(12) United States Patent
Andre et al.

(10) Patent No.: US 7,246,806 B2
(45) Date of Patent: Jul. 24, 2007

(54) SUSPENSION SYSTEM FOR A VEHICLE WHEEL

(75) Inventors: François Andre, Romagnat (FR); Michel Blondelet, Le-Crest (FR); Grigore Gogu, Aubiere (FR); Loïc Serra, Tallende (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 198 days.

(21) Appl. No.: 11/038,381

(22) Filed: Jan. 21, 2005

(65) Prior Publication Data

US 2005/0179225 A1 Aug. 18, 2005

Related U.S. Application Data

(63) Continuation of application No. PCT/EP03/07761, filed on Jul. 17, 2003.

(30) Foreign Application Priority Data

Jul. 22, 2002 (FR) .................................. 02 09625

(51) Int. Cl.
*B60G 21/05* (2006.01)
(52) U.S. Cl. .............................................. 280/124.106
(58) Field of Classification Search ............. 280/5.521, 280/5.52, 124.106, 124.107, 124.11, 124.111, 280/124.134
See application file for complete search history.

(56) References Cited

U.S. PATENT DOCUMENTS 3,497,233 A * 2/1970 Bolaski, Jr. ............ 280/86.757
4,854,603 A * 8/1989 Scaduto ................ 280/124.107
5,580,089 A 12/1996 Kolka
6,189,897 B1 * 2/2001 Santa Cruz et al. ..... 280/5.506
6,467,783 B1 10/2002 Blondelet et al.
6,511,078 B2 * 1/2003 Sebe ........................ 280/5.509
6,513,819 B1 * 2/2003 Oliver et al. .......... 280/124.152

FOREIGN PATENT DOCUMENTS

GB 2 356 606 5/2001
WO WO01/72572 10/2001

\* cited by examiner

*Primary Examiner*—Faye M. Fleming
(74) *Attorney, Agent, or Firm*—Buchanan Ingersoll & Rooney PC

(57) ABSTRACT

A suspension system connects a wheel support to a vehicle body to confer on the wheel support, relative to the body, a degree of camber freedom and a degree of freedom of vertical deflection of the suspension, which freedoms are independent of one another. The suspension system includes an anti-roll device capable of controlling the roll of the body, the anti-roll device being arranged to influence the camber variation as a function of the difference between the vertical deflection of a wheel relative to that of the opposite wheel on the same axle. The system includes suspension elements whose respective inner ends are connected to a rocker for pivoting movement about respective pivot axes that are fixed spacially relative to the rocker.

16 Claims, 9 Drawing Sheets

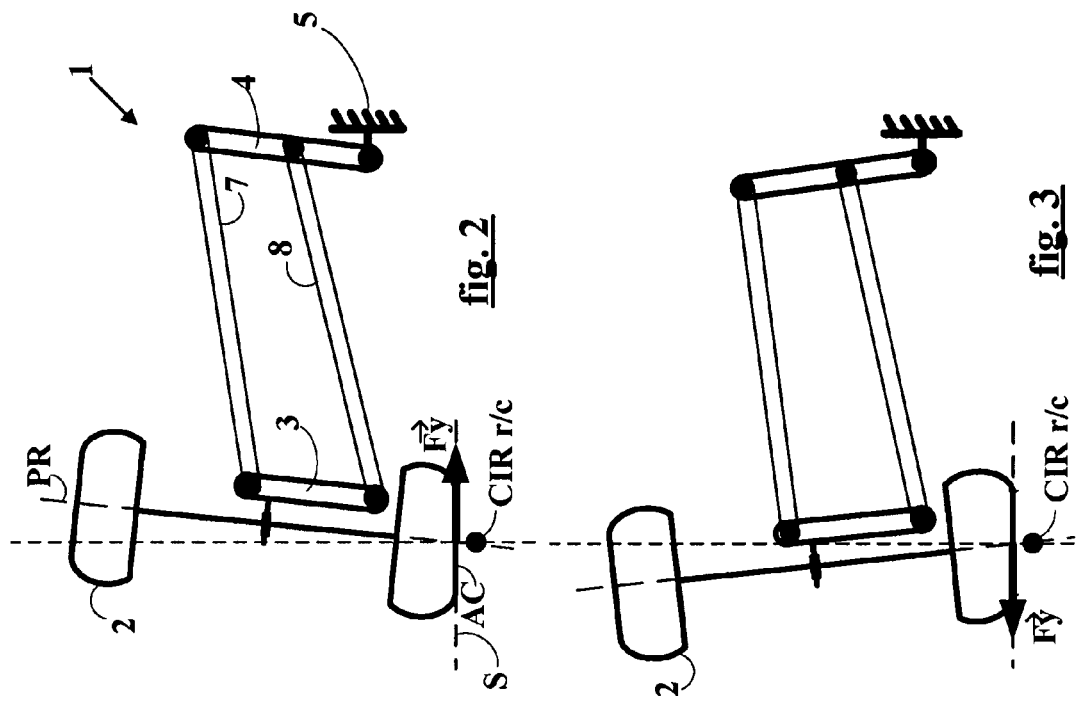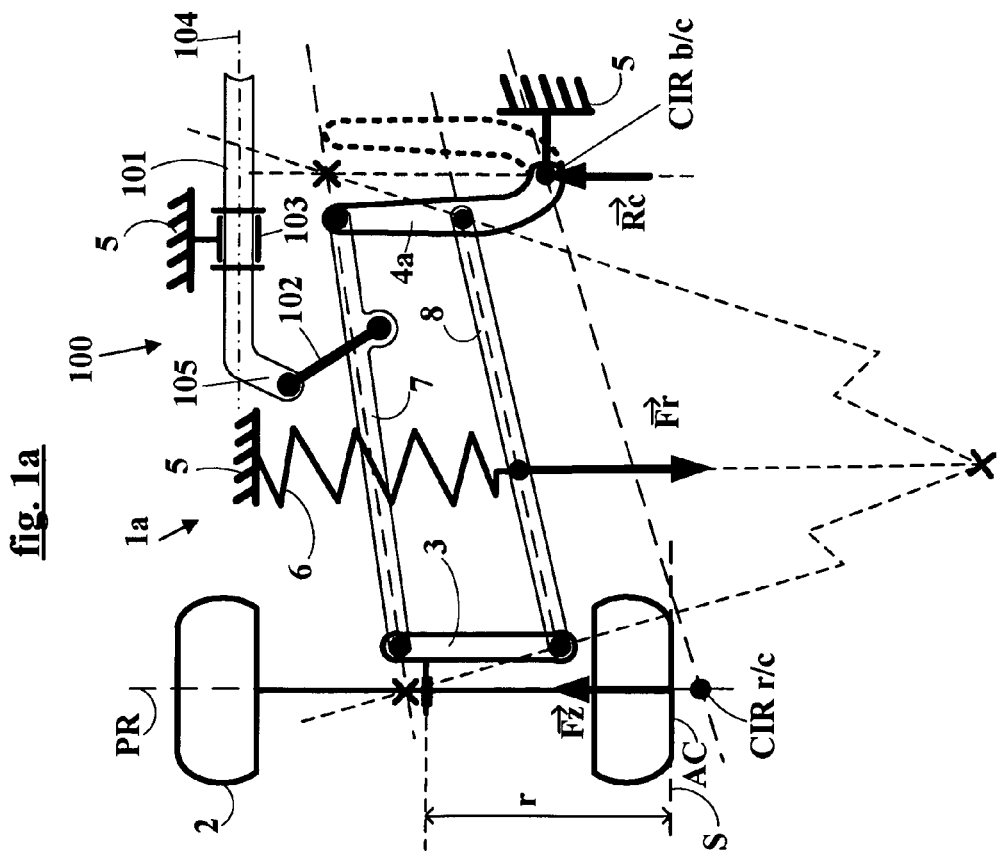

Figure 1:
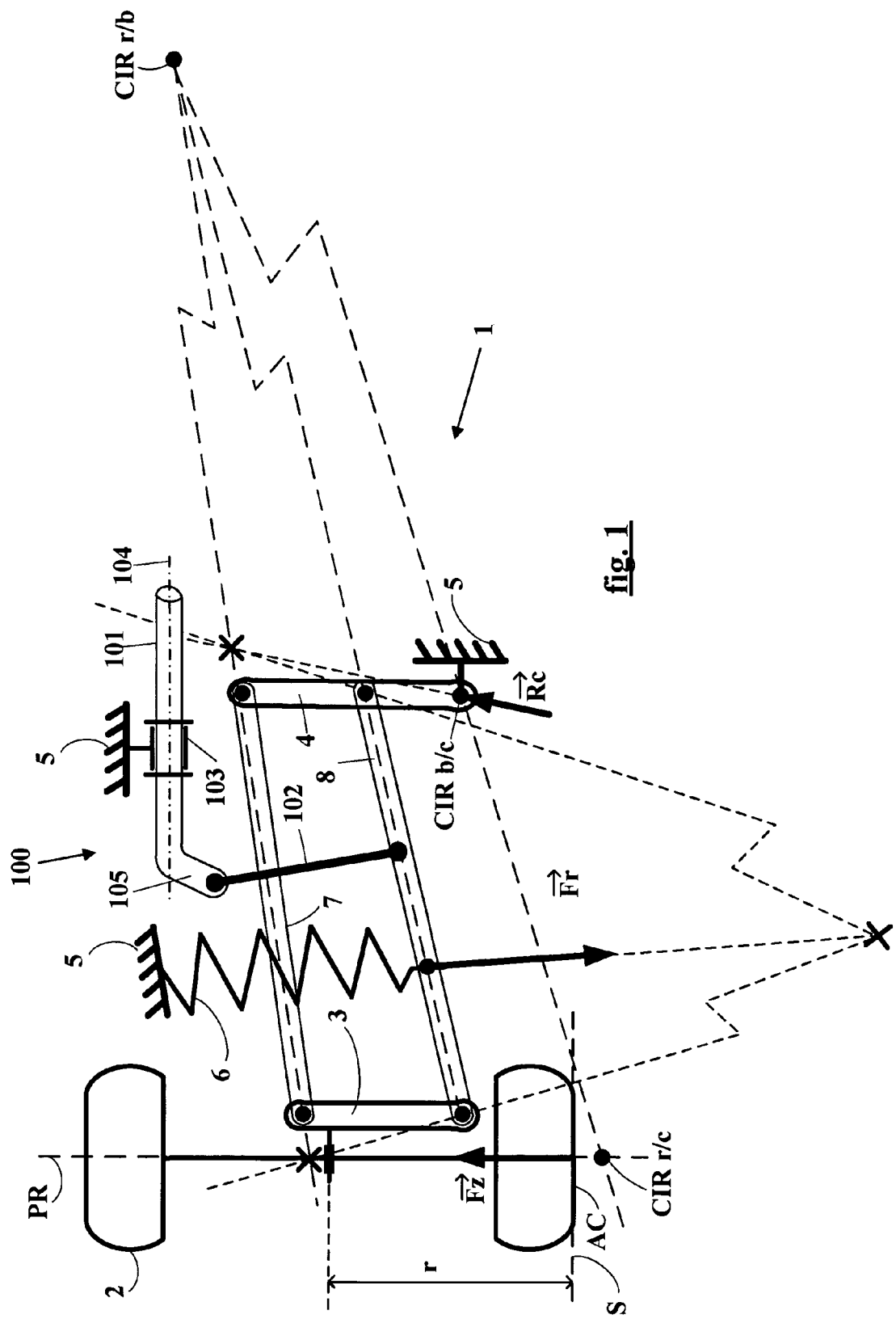

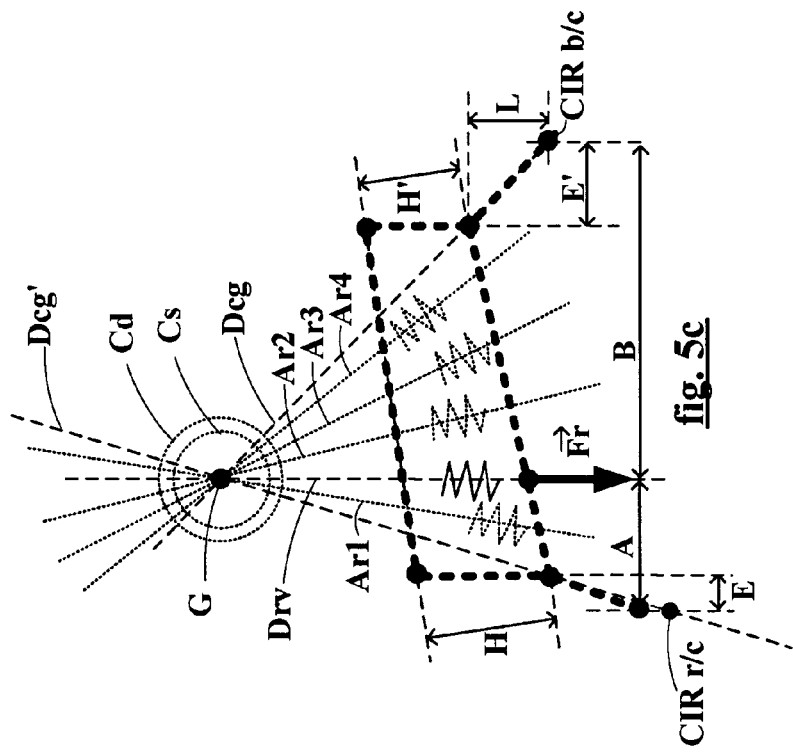
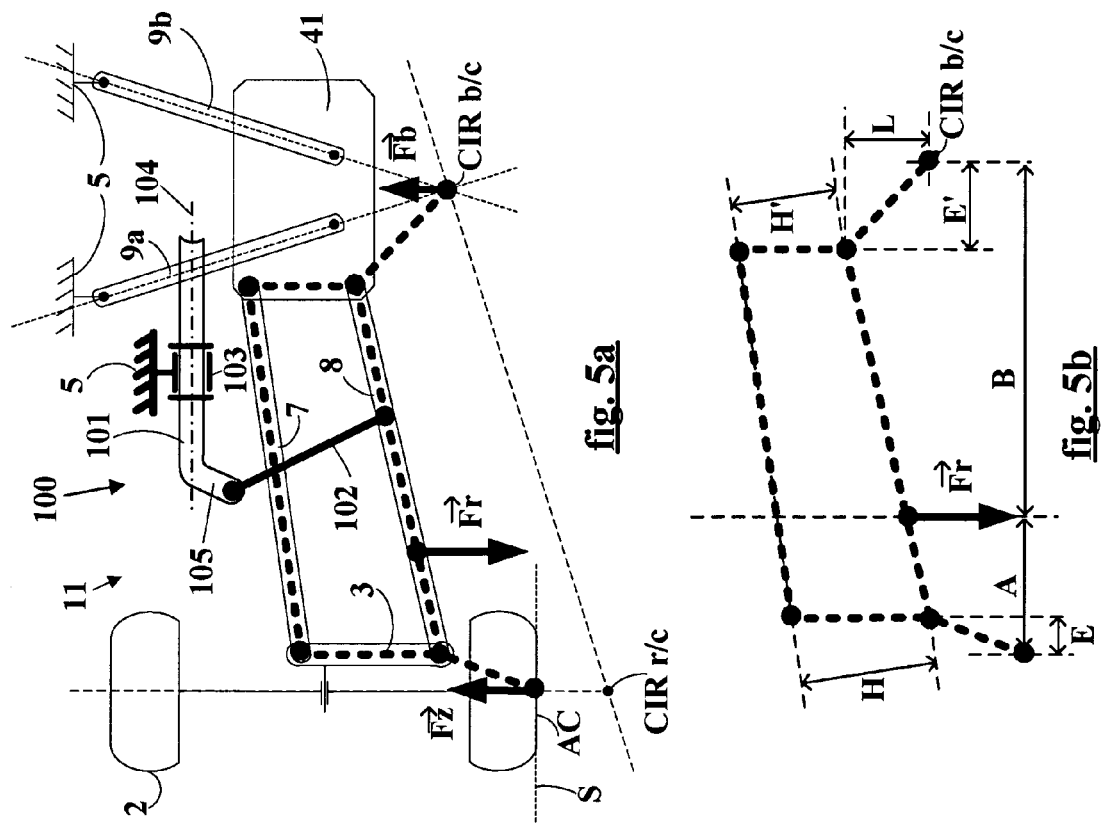
fig. 5a
fig. 5b
fig. 5c

SUSPENSION SYSTEM FOR A VEHICLE WHEEL

This application is a Continuation of International Patent Application Ser. No. PCT/EP03/007761 filed on Jul. 17, 2003, and which published as WO 2004/009383 on Jan. 29, 2004.

The present invention concerns the ground contact system of vehicles, in particular suspension systems and more particularly the guiding of the wheels.

The technical context of the invention and the terminology used in this application are described with precision in the international application published under number WO 01/72572. The reader is invited to refer in particular to the first three pages of that publication.

The present invention concerns suspension systems which confer upon the wheel support, relative to the vehicle body, a degree of freedom of the camber and a degree of freedom of the vertical deflection of the suspension which are independent of one another. Patent application EP 1070609 describes such a device. These systems confer on the wheel an extra degree of freedom compared with those currently used in the present mass-produced vehicles. Such systems can function in a manner referred to as "passive", i.e. they can be configured so that the forces acting on the vehicle produce a camber variation in the direction desired. This variation can be free, or controlled by a means of control. In contrast, if the camber variation is mainly produced by an actuator, the operation is then said to be "active".

One objective of the invention is to be able to amplify, accelerate or facilitate the camber variation desired, for example when the vehicle is driving round a bend. In effect, friction, rigidity or inertia are inevitably present in practice and tend to restrict or impede the camber variation. It is therefore desirable, at least in certain driving situations, for the camber variation to be influenced positively.

Another objective of the invention is that of facilitating the design of such systems in particular in relation to the position of the thrust axes of the suspension springs. In effect it has been found that the position of the thrust axes of the suspension springs, which transmit the load from the body to the axle, greatly influences the dynamic equilibrium of the suspension system. This influence is for example very sensitive when unilateral or alternating vertical forces are acting. For optimum operation of the systems of the present state of the art, there is therefore very little freedom in the positioning of the thrust axes of the springs. It is desirable to increase this freedom of design, for example so as to be able to choose spring positions which optimise the use of the spaces available under the body or which enable the mass of the springs to be reduced.

These objectives are achieved by a suspension system of the aforesaid type which, in accordance with the present invention, comprises in addition an anti-roll device whose influence on the camber is variable as a function of the body roll movement.

Preferably, the system of the invention is such that the wheel support is designed to carry a wheel of radius "r" in contact with the ground, and the camber movement of the wheel support relative to the body has an instantaneous centre of rotation located within a range between 0.3r above ground level and 1.0r below ground level, more preferably 0.5r below ground level.

According to the invention the anti-roll device preferably comprises an anti-roll bar stressed in torsion, which is mounted to rotate with respect to the body, the said anti-roll bar being held fast in translation relative to the said body.

According to an embodiment of the invention, the anti-roll device comprises chambers containing a fluid whose volume varies as a function of the vertical deflection of the suspension.

The anti-roll device can preferably be actively controlled.

Preferably, the device of the invention is configured such that the transverse force (Fy) exerted by the ground on the wheel in the contact area, generated during a small vertical deflection of the suspension, does not exceed a limit corresponding to 0.1P and preferably 0.05P, "P" being the axle load.

The device of the invention is preferably configured such that the camber variation in the absence of transverse force exerted by the ground during a small vertical deflection of the suspension is not larger than 2°.

Preferably, the anti-roll device is configured so that the axis of the thrust resulting from the action of the suspension spring and the anti-roll device on a suspension element during a small unilateral vertical deflection of the suspension, is at most a distance "d" away from the intersection point of the ideal thrust axes, the distance "d" corresponding to 6.5% of the width of the axle.

Preferably, the said anti-roll device is arranged so as to influence the camber variation and the variation of the body roll angle in the same direction.

Preferably, the anti-roll device comprises an arm connected to the suspension elements, the said arm being inclined relative to the vertical in the mean position of the suspension so that an upper end of the said arm is closer to the wheel plane than a lower end and, more preferably, the arm is so inclined at an angle greater than 5° relative to the vertical.

Preferably, the suspension system comprises a rocker connected at one end to the body and at the other end to the suspension elements, the connection of the said rocker to the body allowing the said degree of camber freedom.

Preferably, the said instantaneous centre of rotation is located below ground level so that the transverse forces exerted by the ground on the wheel in the contact area induce an inclination of the wheel support relative to the body in the direction of reducing the camber when the said transverse forces are directed towards the inside of the vehicle, and in the direction of increasing the camber when the said transverse forces are directed towards the outside of the vehicle.

Preferably, the system of the invention also comprises an opposite wheel support designed to carry an opposite wheel of an axle of the said vehicle, the said opposite wheel support being connected to the rocker in a configuration symmetrical to that of the first wheel support so that the suspension system guides and suspends the two wheels on one and the same axle. Preferably, the system of the invention comprises means for controlling the steering connecting the wheel support to the rocker. These steering control means can also connect the wheel support to the rocker in such a way that the steering depends on the camber movement.

The invention also concerns a vehicle fitted with the system of the invention. The vehicle can be fitted on the same axle with two devices, the said devices being arranged essentially symmetrically relative to the longitudinal axis of the vehicle. These two devices can be interconnected so that the camber movements of each wheel support are coupled. If the suspension device(s) comprise(s) a controllable actuator, the latter can be controlled as a function of vehicle driving parameters. The vehicle can also comprise two independent devices on the same axle, each controlled by an actuator independently of the other.

Several embodiments of the invention will be described, to illustrate its characteristics and explain its principles. Naturally, many other embodiments of the invention are possible as suggested by the numerous variants.

Figure 6:
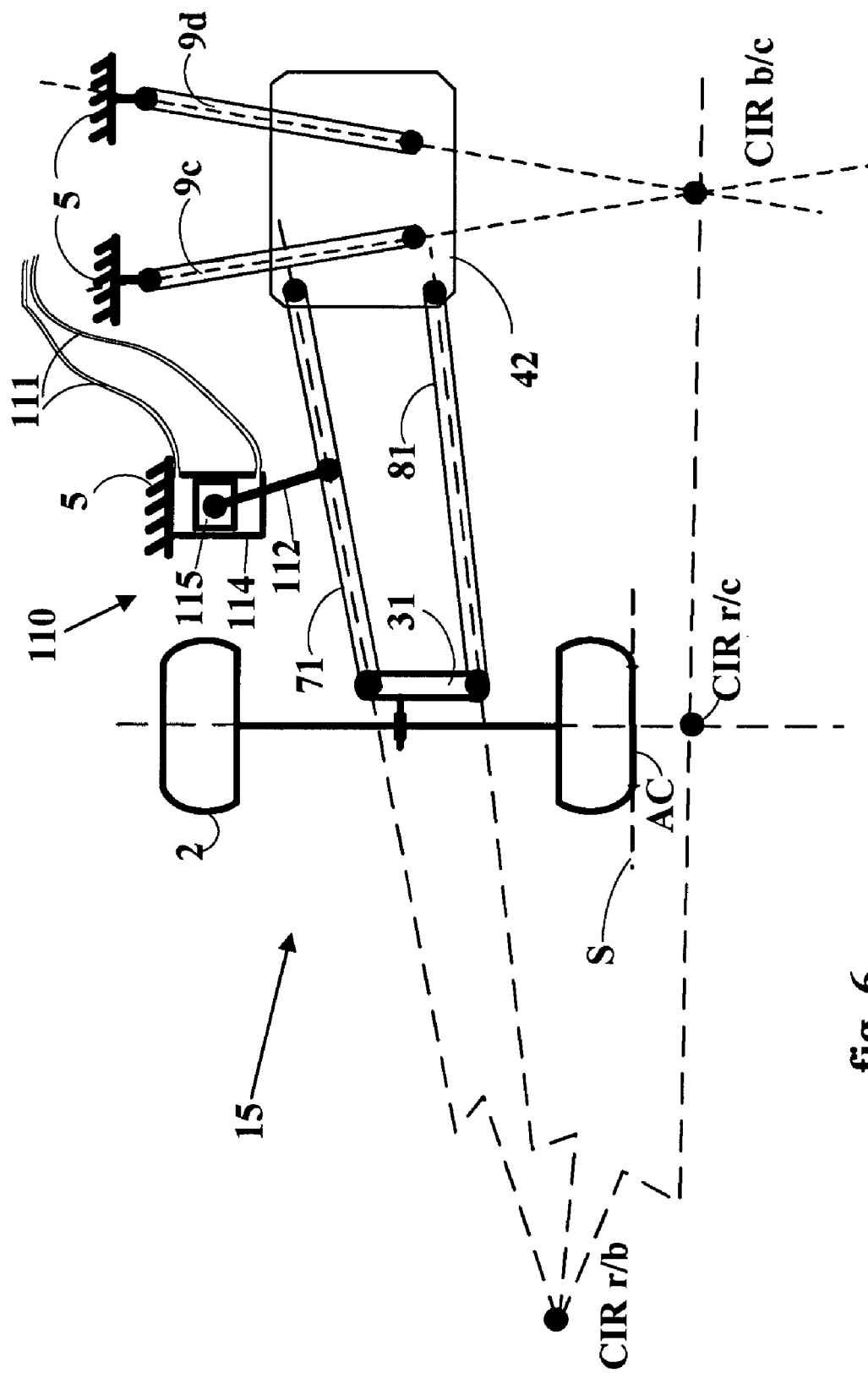
Figure 7:
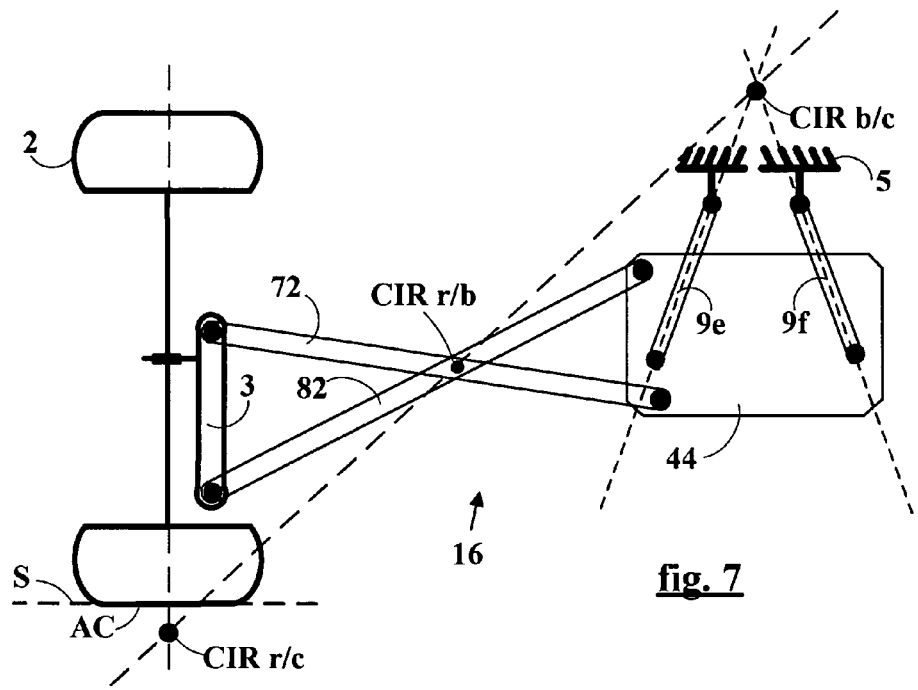
Figure 8:
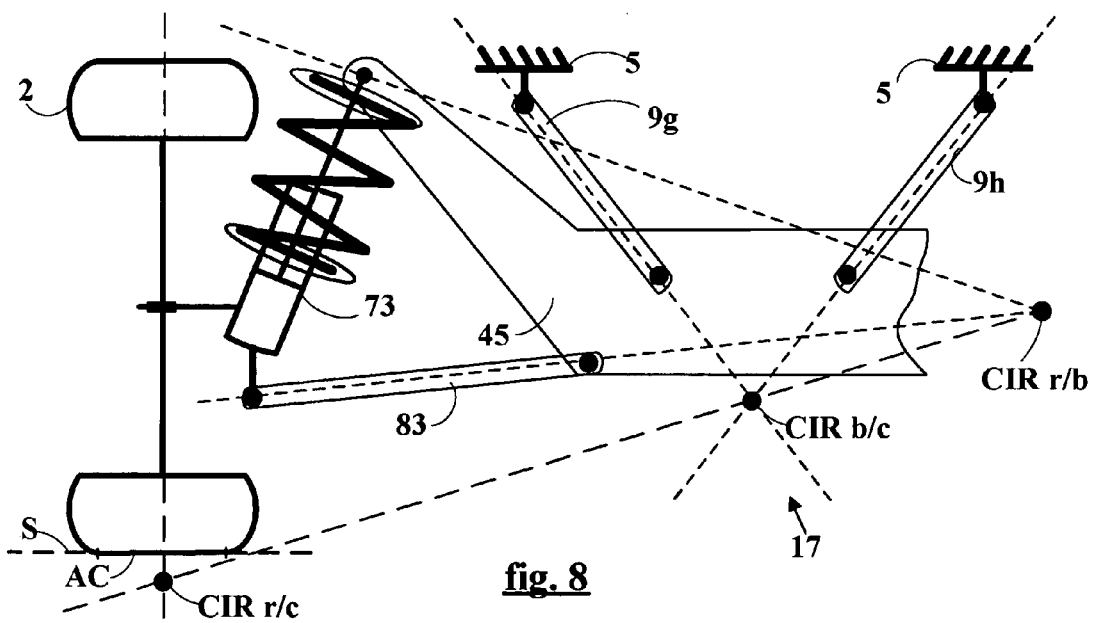
Figure 9:
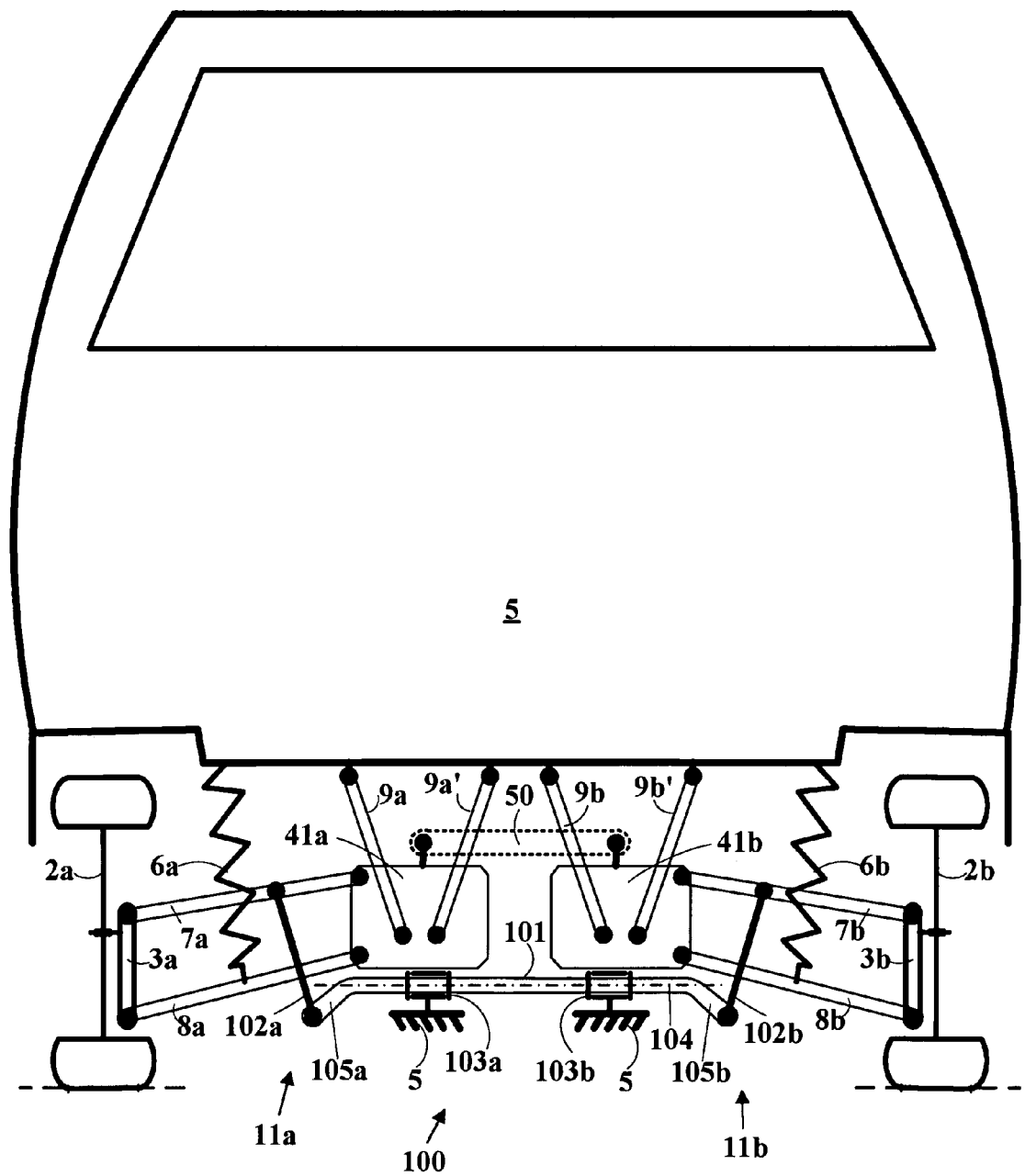
Figure 10:
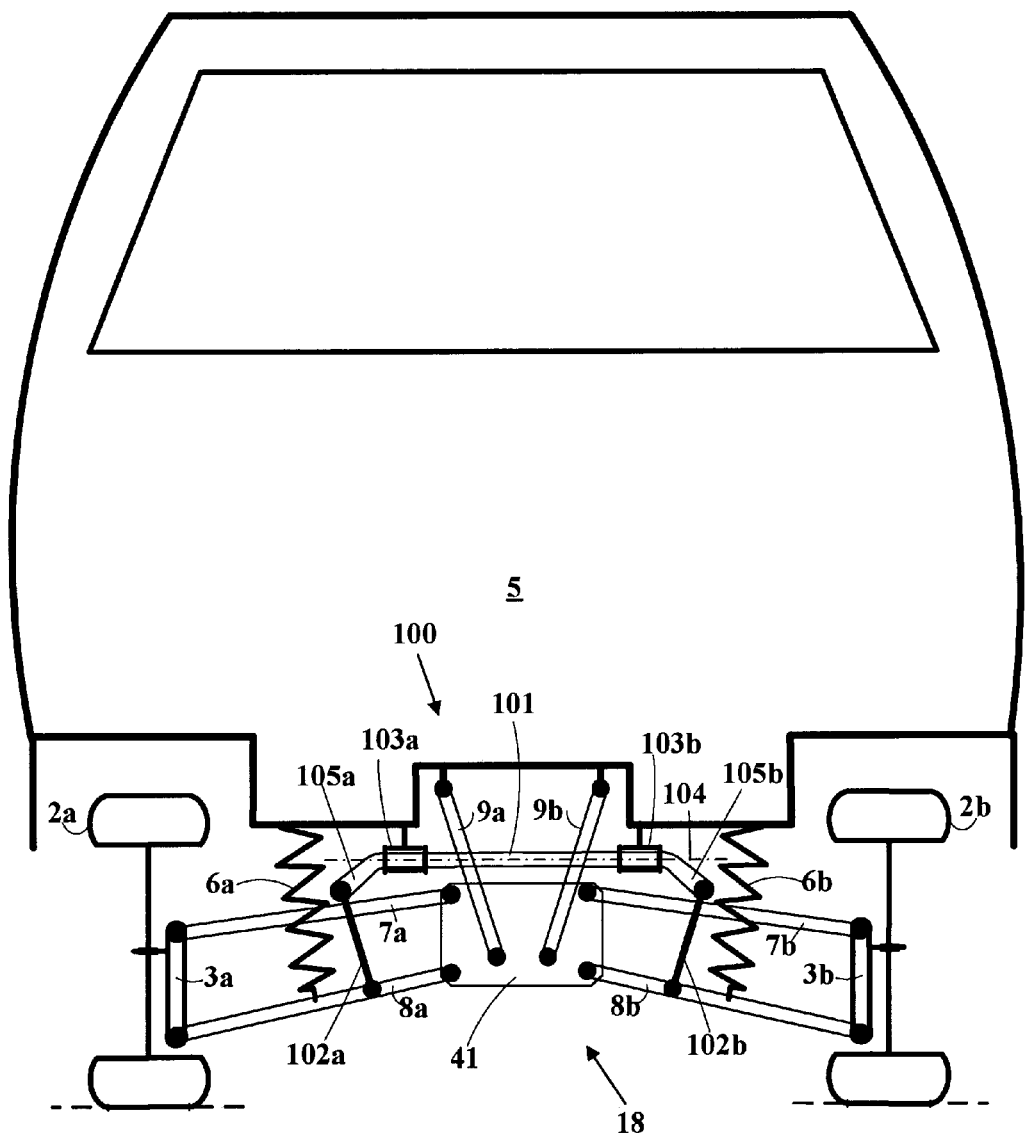
Figure 11:
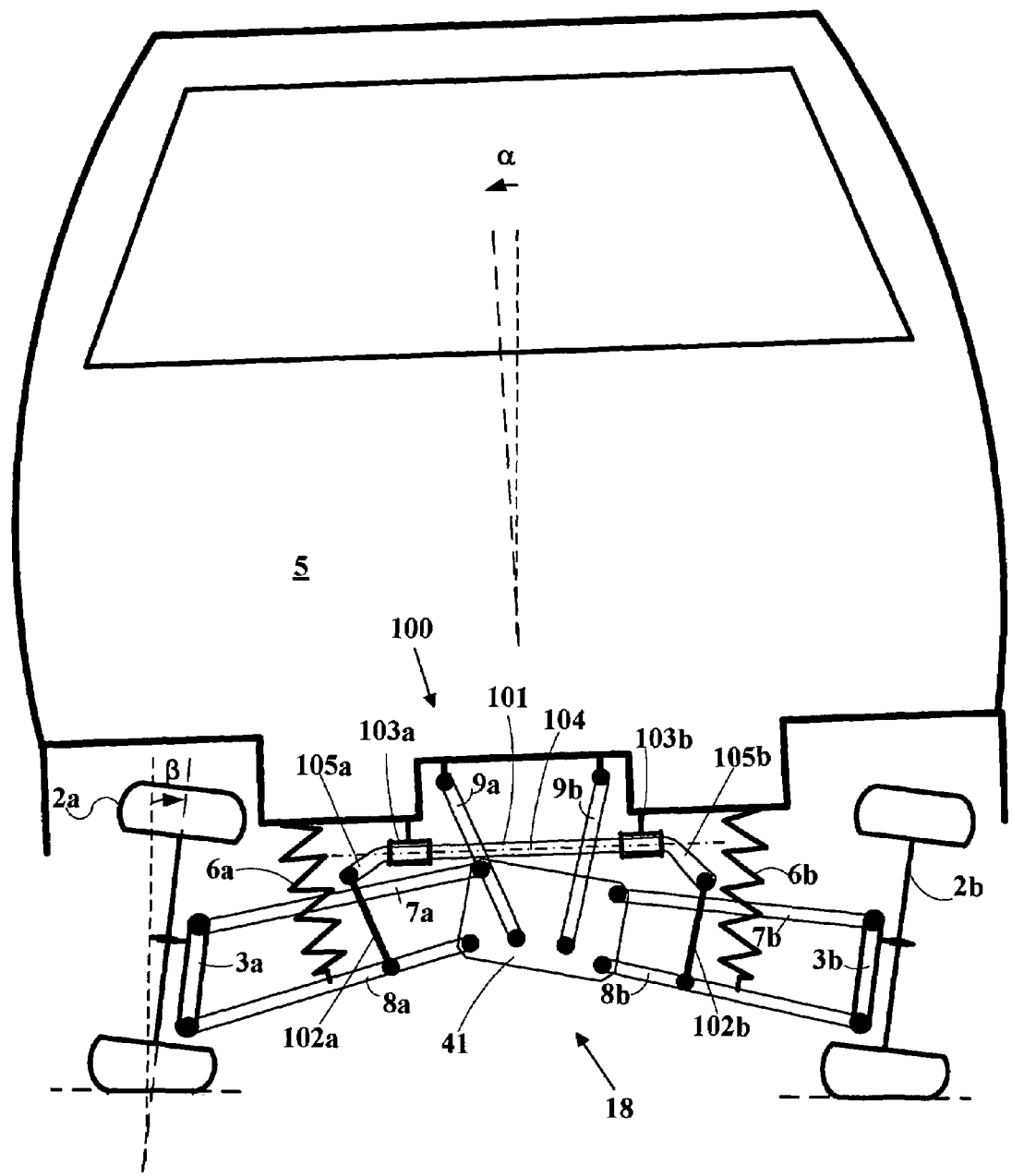

FIGS. 1, 1a, 2 and 3: Schematic illustrations of the principle and operation of a system according to a first embodiment of the invention, showing longitudinal views;

FIGS. 4, 5, 5a, 5b and 5c: Schematic illustrations of the principle and operation of a system according to a second embodiment of the invention, showing longitudinal views;

FIG. 6: Schematic illustration of variants of the second embodiment of the invention, showing a longitudinal view;

FIGS. 7 and 8: Schematic illustrations of the principle of systems according to other embodiments of the invention, showing longitudinal views;

FIGS. 9, 10 and 11: Schematic illustrations of the principle of vehicles according to the invention, showing longitudinal views.

The figures are not drawn to scale.

FIG. 1 shows a longitudinal planar view of a suspension system 1 according to the invention. This planar view (i.e. in 2 dimensions) is very convenient because it shows clearly how the system according to the invention differs from the systems of the prior art.

The suspension system 1 comprises a wheel support 3 designed to maintain the plane PR of a wheel 2, upper and lower arms 7 and 8 respectively, a rocker 4 and a suspension spring 6. The wheel 2, of radius "r", rests on the ground S on its contact area AC. The upper arm 7 and lower arm 8 are articulated at their outer ends (relative to the vehicle for which the system is intended) to the wheel support 3, and at their inner ends to the rocker 4. The rocker 4 is articulated to the body 5 of the vehicle (represented schematically). Thus, the suspension system 1 is configured so as to confer on the wheel support, relative to the body 5, a degree of camber freedom since the wheel support can tilt relative to the body, and a degree of suspension freedom since the wheel support can undergo essentially vertical movements in a manner known as such, for example in the manner of "multi-arm" systems.

According to the invention, the suspension system comprises an anti-roll device 100. In the example illustrated schematically in FIG. 1 the anti-roll device comprises a bar 101 extending essentially transversely to the vehicle, mounted to pivot relative to the body about an axis 104 via one or more bearings 103. The anti-roll bar 101 has a curved end 105 acting as a lever arm relative to the axis 104. This generally horizontal lever arm is connected via a rod 102 to a mobile element of the suspension, in this case the lower arm 8. The figure illustrates the left-hand part of the anti-roll device 101. In a way known as such, the right-hand part (symmetrical and not shown) of the anti-roll device is connected to the suspension elements of the opposite wheel.

Adopting the classical hypothesis of a point contact between the wheel 2 and the ground S, the theory that instantaneous centres of rotation in a planar movement must be colinear allows the instantaneous centre of rotation of the camber movement (CIR r/c) to be located at the intersection of the wheel plane PR and the line on which the other two instantaneous centres of rotation are located, namely that of the rocker's movement relative to the body (CIR b/c) and that of the wheel support's suspension movement relative to the rocker (CIR r/b). This kinematic reasoning is commonly applied in the field of suspension systems. It can then be understood that the configuration chosen, i.e. the dimensions and orientation of the various elements constituting the suspension system (by defining the positions of the characteristic axes of the suspension elements) makes it possible to obtain a desired position of the instantaneous centre of rotation (CIR r/c) of the camber movement. FIG. 1 shows a suspension system in a mean position, which can be defined as the position corresponding to driving in a straight line on level ground when the vehicle is carrying its nominal load.

One function of the anti-roll device is to restrict body roll. In effect, when the body 5 tilts (for example when cornering), i.e. when the vertical deflections of one wheel relative to the other are essentially in opposite directions, the anti-roll device opposes this rolling motion by exerting force on the most deflected part of the suspension and on the contrary reducing the load transmitted to the part of the suspension that is less deflected. This function is known as such.

According to the invention, another function of the anti-roll device 100 is to influence the camber. In effect, the anti-roll device is configured so that when two wheels on the same axle undergo opposite vertical deflections, the forces it transmits to the suspension elements modify the camber. Preferably, the anti-roll device is configured so that the transverse forces it transmits to the suspension elements influence the camber in the same way that they influence the roll, i.e. for example when the vehicle is rounding a bend to the right so that the body tends to tilt to the left, the anti-roll device exerts a couple which tends to tilt the body to the right (towards the inside of the bend) while at the same time exerting transverse forces on the suspension elements which also tend to tilt the wheel 2 to the right (and thus towards the inside of the bend).

Among the design constraints of such a device, it can be seen clearly from the figure that the position of the articulation point of the rocker on the body is limited, towards the bottom of the figure, by the proximity of the ground. Thus, depending on the ground clearance desired for the vehicle, various configurations can be chosen.

FIG. 1 illustrates the case of a particular configuration in which the force Fr exerted by the spring is inclined towards the inside of the vehicle. In the absence of a transverse force exerted by the ground on the wheel in the contact area (the force Fz is vertical), equilibrium is obtained when the force Rc exerted by the body on the rocker is as shown, i.e. inclined slightly towards the inside of the vehicle. This determination can be effected by calculation or by graphical construction. Such a graphical construction, based on the equilibrium of the device's various elements, is represented in FIG. 1 by broken lines. It can be seen that the condition of equilibrium can be ensured even if the thrust of the spring is inclined. FIG. 1a illustrates an interesting variation compared to the configuration of FIG. 1. In this suspension system 1a the idea is that the force Rc exerted by the body 5 on the rocker 4a should also be vertical.

The graphical constructions shown in FIGS. 1 and 1a are based on the equilibria of the various elements of the systems 1 and 1a. In the case of FIG. 1a, where two of the forces (Fz and Rc) are vertical, overall equilibrium of the suspension system requires that the third force (Fr) should be vertical as well. This configuration allows perfect static equilibrium of the vehicle because the body (in its mean position) is not subjected to any lateral force, in contrast to the configuration of FIG. 1 in which static equilibrium of the vehicle is ensured by the symmetry of the forces acting on the body.

The dotted line in FIG. 1a illustrates the fact that the rocker 4a can also be the rocker of the (essentially symmetrical) suspension system of the opposite wheel, as will be described in more detail with reference to FIG. 10.

The anti-roll device 100 shown in FIG. 1a is entirely similar to that of FIG. 1. However, the rod 102 is in this case connected to the upper arm 7 while the spring 6 remains connected to the lower arm 8.

FIG. 2 shows the suspension system of FIG. 1 in a position where the camber has undergone a negative variation. The wheel 2 is tilted towards the inside of the vehicle by a rotation around the instantaneous centre of rotation of the camber movement (CIR r/c). Note that the position of that point is not fixed because the position of the instantaneous centre of rotation of the suspension (CIR r/b) varies slightly owing to the pivoting of the lower 8 and upper 7 arm in this example. This variability, of course, is itself governed by the geometrical configuration of the system.

Since the instantaneous centre of rotation of the camber movement (CIR r/c) is located under the contact area, the camber variation shown here can be produced by a transverse force Fy exerted by the ground S on the wheel 2 in the contact area AC. This force Fy directed towards the inside of the vehicle can originate from the transverse acceleration occurring when cornering, or when the ground S is inclined relative to the horizontal.

FIG. 3 repeats the example of FIGS. 1 and 2 in the case of a positive camber variation that can be produced by a transverse force Fy directed towards the outside of the vehicle.

Figure 4:
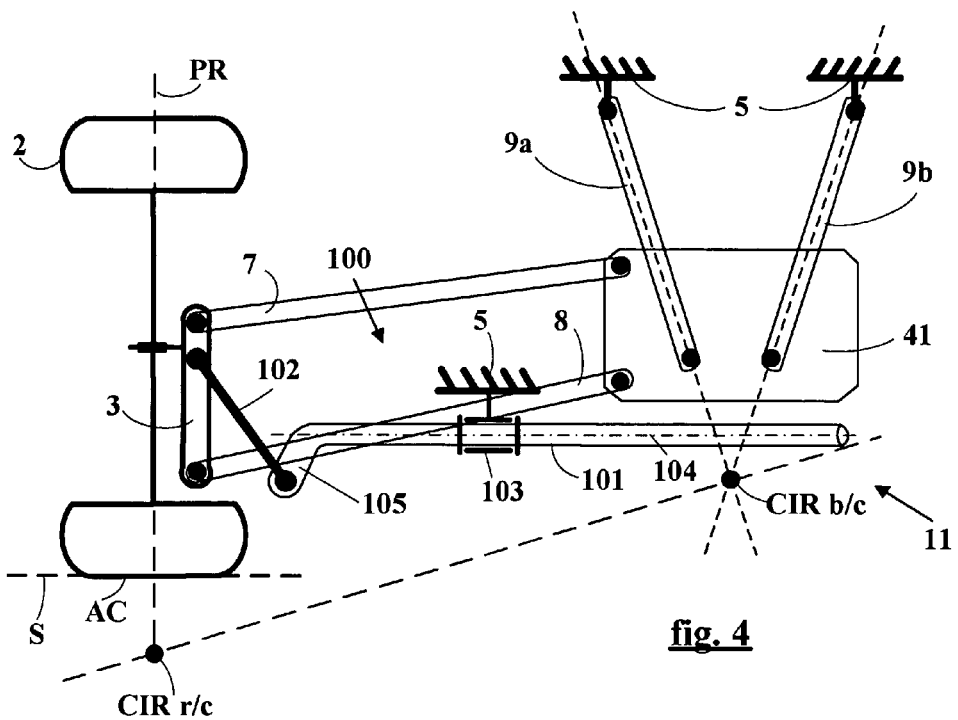

In a manner similar to FIG. 1, FIG. 4 illustrates a second embodiment of the invention. To allow direct comparison with the first embodiment, the instantaneous centres of rotation (CIR r/b, CIR b/c, CIR r/c) have essentially the same positions. This, however, is only an example (as in the case of the first embodiment), and an infinite number of configurations are possible. The difference compared with FIG. 1 is in the way the rocker 41 is articulated with respect to the body 5. Rotation of the rocker around the instantaneous centre of rotation CIR b/c is enabled by a link comprising two rods 9a and 9b, themselves articulated to the body in such manner that their respective axes meet, in the mean position shown here, at the instantaneous centre of rotation (CIR b/c) of the rocker 41 with respect to the body 5. Thus, the rocker 41 is articulated with respect to the body by a virtual pivot, i.e. a pivot that is not in the form of an actual pivot joint about a fixed and unique point as in the previous figures. This has two important consequences: on the one hand the position of this point is not fixed relative to the body because it moves appreciably during the oscillation of the rocker, and on the other hand its position is not limited in relation to the ground as that of the same point can be in the case of FIG. 1. The system of FIG. 4 also comprises an anti-roll device 100 containing the same elements as those of the preceding figures. In this example, however, the anti-roll device is arranged lower relative to the vehicle and the rod 102 is connected to the wheel support 3.

Figure 5:
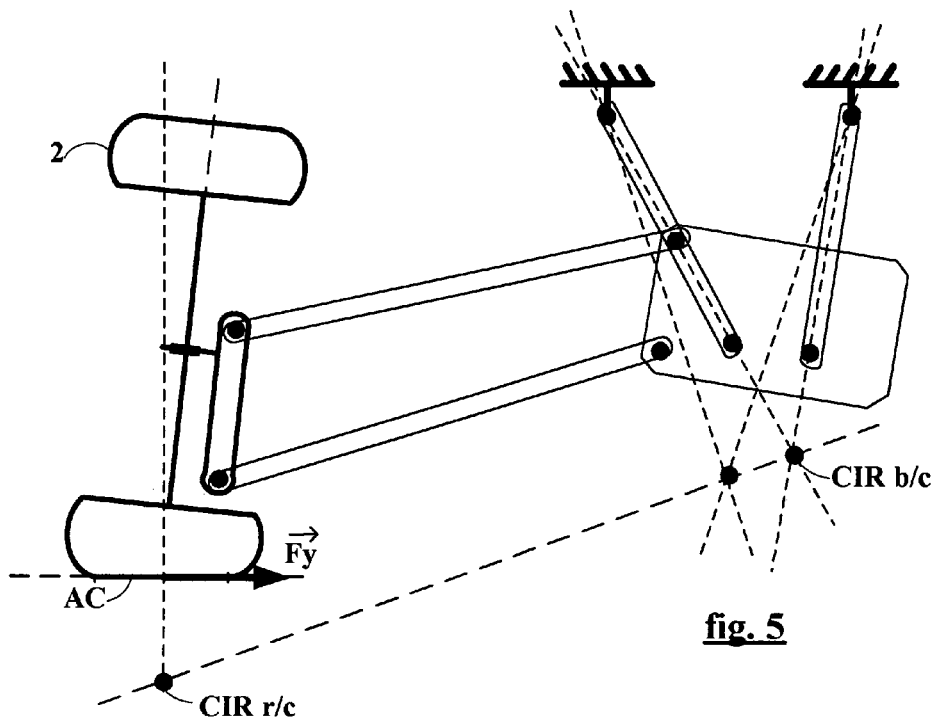

FIG. 5 shows the same suspension system in a camber position comparable to that of FIG. 2 (but with the anti-roll device omitted from the figure).

To ensure that the system will be in perfect equilibrium when subjected to a vertical force Fz exerted by the ground in the contact area, the system must be configured such that in the mean position of the wheel, each element of the system is also in equilibrium.

FIGS. 5a and 5b show a means of realising this equilibrium condition. This configuration, illustrated here starting from the example configuration of FIG. 4, is based on the hypothesis of a spring producing a vertical thrust Fr on one of the arms, here the lower arm 8. The suspension system's equilibrium depends on external forces which are the vertical force Fz exerted by the ground in the contact area, the force Fr exerted by the spring on the arm 8, and the resultant Fb of the forces exerted by the rods 9a and 9b on the rocker. FIG. 5b shows the characteristic dimensions of the system. "E" is the distance, projected onto a horizontal line, separating the centre of the contact area from the articulation point of the wheel support 3 with the arm (8) carrying the spring. "E'" is the distance, projected on a horizontal line, separating the instantaneous centre of rotation of the rocker relative to the body (CIR b/c) from the point of articulation of the arm carrying the spring (8) to the rocker (41). "H" is the distance in the camber plane, between the articulation point of the rocker 41 to the arm carrying the spring (8) and the axis of the arm which is not carrying the spring (7). "A" is the distance, in the camber plane, between the centre of the contact area and the axis of the spring's thrust Fr. "B" is the distance, in the camber plane, between the instantaneous centre of rotation (CIR b/c) and the axis of the spring's thrust Fr. Note that when the instantaneous centre of rotation CIR b/c is located in the median plane of the vehicle, the sum of the distances A and B corresponds to the half-track of the vehicle.

Starting from these hypotheses, solution of the equilibrium equations of the various elements leads to the following condition: perfect equilibrium is obtained when the ratio EBH'/E'AH is equal to 1. The formulas are based on the assumption of links with no friction or stiffness. In practice, satisfactory operation can be obtained when the system is configured such that it is close to equilibrium, for example with a EBH'/E'AH ratio between 0.5 and 1.5. This criterion, of course, is generally applicable and is not limited to the configuration used here to illustrate it. A way of applying the criterion to a given configuration (given A+B, E, E', H and H') is, for example, to deduce from it the position of the ideal axis of a vertical thrust Fr (by calculating A and B).

To satisfy perfectly the condition for equilibrium of the system and its elements in the general case when the thrust is not necessarily vertical, solution of the equilibrium equations has shown that for a given configuration the axis of the spring's thrust must pass through a unique point. This unique point can be defined as the point of coincidence of the axes of ideal thrusts.

To determine this point of coincidence, two different ideal axes can be determined and their intersection in the camber plane sought. It has also been found that this point is located at the intersection of every ideal thrust axis and the line passing through the instantaneous centre of rotation (CIR b/c) of the rocker relative to the body and through the pivot point, on the rocker, of the arm carrying the spring. As explained below, this finding enables a simple determination of the coincidence point starting from the configuration considered.

The graphical determination of the coincidence point is illustrated in FIG. 5c, considering the example of the configuration shown in FIG. 5. To determine this point (G), in this case a particular vertical ideal thrust axis (Drv) has been used, whose position can be determined as a function of the system's geometrical characteristics. In effect, it was pointed out earlier that in the case of a vertical thrust the position of the ideal thrust axis satisfies the condition that the ratio EBH'/E'AH is equal to 1 (see FIG. 5b). The line Dcg is that which passes both through the point CIR b/c and through the pivot point, on the rocker 41, of the arm carrying the spring (here the lower arm 8). The line Drv intersects the line Dcg at G. This point G is therefore the unique point (for a given configuration) through which the thrust axis must pass to ensure perfect equilibrium. G is the coincidence point of the ideal thrust axes. Four examples have been shown (Ar1, Ar2, Ar3, Ar4) of ideal thrust axes which satisfy the equilibrium conditions for the mean position of the wheel. Springs have also been represented schematically. In practice a spring can be incorporated in many ways, the pertinent criterion being the position of the axis (Ar1, Ar2, Ar3, Ar4) of its thrust.

During the operation of the suspension device, the thrust axis of the spring can vary because of displacements of the various elements. The thrust axis of the spring may then move away from the point G (which is determined in an average position) and equilibrium will then deviate from perfect equilibrium.

Besides its variation during the operation of the device, in the mean position the thrust axis can also deviate from the coincidence point for example owing to manufacturing tolerances and/or design compromises such as stiffness of the articulations. Preferably, however, the transverse forces exerted by the ground on the wheel in the contact area that are generated during large vertical deflections of the suspension does not exceed a limit corresponding to 0.3P when driving in a straight line, "P" being the axle load. One way to satisfy this condition is to ensure that the distance, in the camber plane, between the point G and the spring's thrust axis, during large vertical deflections, does not exceed 20% of the distance A+B. It is also preferable for the transverse force exerted by the ground on the wheel in the contact area that is generated during small vertical deflections of the suspension, not to exceed a limit corresponding to 0.1P when rolling in a straight line. One way to satisfy this condition is to ensure that the distance, in the camber plane, between the point G and the spring's thrust axis, in the mean position, does not exceed 13% of the distance A+B. Since this last criterion applies in the mean position, it can easily be checked by static measurements of the suspension system.

The zone through which the thrust axis must pass during large vertical deflections to satisfy the first distance criterion specified above, has been represented schematically by a first circle Cd (whose radius corresponds to 20% of the distance A+B) centered on the coincidence point G.

The zone through which the thrust axis must pass to satisfy the second distance criterion specified above, has been represented schematically by a second circle Cs (whose radius corresponds to 13% of the distance A+B).

The example shown in FIG. 5c is a particular configuration, but it is easy to see that the coincidence point (G) can be determined in a similar way for any configuration of the system according to the invention, and that the equilibrium criteria associated with the reasoning are also applicable.

"Ideal thrust axis" or "ideal axis of thrust" is understood to mean any thrust axis of the spring such that the device is in perfect equilibrium in the mean position of the wheel, in the absence of any transverse force exerted by the ground in the contact area. The mean wheel position can be defined as its design position, i.e. the position of the wheel relative to the body when each wheel is carrying its nominal load and the orientation of the wheel plane corresponds to driving in a straight line.

To take account of the action of the anti-roll device during a small, unilateral vertical deflection of the suspension, the reasoning can be applied to an overall thrust axis resulting from the combined action of the suspension spring and the anti-roll device. It is then this overall thrust axis which must satisfy the above-mentioned equilibrium criteria.

Preferably, the anti-roll device is configured such that the camber variation in the absence of a transverse force (Fy) exerted by the ground during a small vertical deflection of the suspension does not exceed 2°.

An interesting method for satisfying the criteria chosen for the operation of the device according to the invention consists in making a series of experiments on the parameters of the configuration and selecting the most favourable configurations.

"Large vertical deflections" is understood to mean essentially vertical deflections of the suspension on either side of the mean wheel position which can reach up to 80% of the deflection permitted by the suspension system, and "small vertical deflections" means essentially vertical deflections of the suspension on either side of the mean wheel position which are limited to 20% of the deflection permitted by the suspension system.

"Configuration" is understood to mean the collective of geometrical characteristics of the suspension system, as determined in the mean position of the wheel.

FIG. 5a shows an anti-roll device 100 similar to that of FIG. 1.

FIG. 6 illustrates an embodiment similar to that of FIGS. 4 and 5, but whose instantaneous centre of camber rotation (CIR r/c) is obtained by a different configuration. In effect, in this configuration the upper 71 and lower 81 arms converge towards a point (CIR r/b) which is lower (and is this time located towards the outside of the vehicle), and the pivot point of the rocker 41 relative to the body 5 (i.e. the instantaneous centre of rotation CIR b/c) must also be located lower down. In the example shown, this point is below ground level S, i.e. it can only be a virtual pivot. Thus, this configuration of the instantaneous centres of rotation cannot be produced with the system described in FIGS. 1 to 3. The example shown illustrates another embodiment of the anti-roll device according to the invention. This anti-roll device 110 operates on the principle of communicating vessels. The rod 112 controls a piston 115 moving in a cylinder 114 connected to the body 5. The piston 115 separates two chambers filled with a fluid (gas and/or liquid). The pressure in those chambers is transmitted by the pipes 111 to an equivalent device acting on the suspension system of the opposite wheel, such that a suspension deflection of the wheel 2 tends to generate a movement in the same direction by the opposite wheel. For this, the pipes 111 can for example be connected so that the lower chamber of the cylinder 114 is connected to the upper chamber of the opposite cylinder and vice-versa. An active or passive control device can also be incorporated in this fluid circuit.

FIG. 7 shows an embodiment very different from those described so far, in that the desired position of the instantaneous centre of camber rotation (CIR r/c) is obtained by a combination of an instantaneous centre of rotation (CIR b/c) of the rocker 44 relative to the body 5 located high up, and an instantaneous centre of rotation (CIR r/b) of the wheel support relative to the rocker which is located at the crossing point of the arms 72 and 82. The orientation of the rods (9e, 9f) is thus inverted compared with the configurations described earlier, so as to enable such a position of the point CIR b/c. Naturally this is only an example embodiment and the articulation means of the rocker 44 could certainly take the form of that illustrated in FIG. 1 provided that the pivoting takes place at the desired height relative to the body 5. An advantage of this configuration is that the roll centre of such a suspension system is appreciably higher than in the earlier configurations. This can be advantageous, for example, in vehicles with a relatively high centre of gravity, such as minivans or SUVs ("sport utility vehicles").

FIG. 8 shows an embodiment very different from the earlier ones in that it uses a Macpherson suspension structure (73, 83) articulated to a rocker 45 whose function is the same as before. The desired position of the instantaneous centre of camber rotation (CIR r/c) is thus obtained by the combination of an instantaneous centre of rotation (CIR b/c) of the rocker 45 relative to the body 5 and an instantaneous centre of rotation of the wheel support relative to the rocker (CIR r/b) located at the crossing point of the axis of the lower arm 82 and the normal to the axis of the Macpherson force strut 73. The implantation of the rods (9g, 9h) is comparable to that in the embodiments described earlier. Naturally, as with most of the examples described here, the connection of the rocker to the body may be a mobile, virtual pivot (as in FIG. 8) or a fixed, real pivot as in FIGS. 1 to 3, or a fixed and virtual pivot (not shown here).

FIG. 9 shows a vehicle according to the invention. It is equipped with two suspension systems according to the invention, arranged essentially symmetrically relative to the longitudinal axis of the vehicle. The suspension systems shown here are configured as described earlier in FIGS. 4 and 5. They can of course be independent of one another, or alternatively linked by a coupling means such as a push-rod 50 (indicated by dotted lines). This couples the behaviours of the two wheels (2a, 2b), at least in terms of camber. Such coupling can make it easier to satisfy the conditions for the vehicle's equilibrium. When the two systems are independent, they can be independently controlled. If this independent control is of the active type, it can be actuated differently for each wheel. For example, it may be desired only to modify the camber of the wheel on the outside of the bend.

FIG. 9 shows rockers (41a, 41b) which are relatively close together, but this is a particular configuration and each rocker can in contrast be closer to its respective wheel.

Alternatively, in a similar design and in order for example that the transverse arms (7a, 8a, 7b, 8b) be longer, the rockers 41a and 41b can be in slightly different planes along the longitudinal axis of the vehicle, with the arms guiding the left-hand wheel 2a being pivoted on the right-hand rocker 41b and vice-versa.

Here, the anti-roll device 100 is represented as a whole. It is entirely similar to that of FIG. 4 except in that the rods (respectively 102a and 102b) are in this case connected to the upper arms or wishbones (7a and 7b respectively).

FIG. 10 shows another vehicle according to the invention. It is fitted with a preferred embodiment of the suspension system 18 according to the invention. This system, which is comparable to those described earlier, comprises in addition an opposite wheel support 3b designed to carry an opposite wheel 2b of an axle supporting the body 5 of the vehicle. The said opposite wheel support 3b is connected to the rocker 41 in a configuration essentially symmetrical to that of the wheel support 3a. An advantage of this embodiment is, of course, that the number of elements involved is smaller compared with the variant shown in FIG. 9. This generally has a direct effect on cost. Another advantage is that the coupling effect, described as an option in FIG. 9, is in this case total. A further difference of this embodiment of the vehicle according to the invention compared with that of FIG. 9, is that the system can be incorporated under the vehicle while taking up less space. A particular design has been shown here but, naturally, any embodiment of the invention (whether or not illustrated earlier) can constitute a single axle of this type.

Here, the anti-roll device 100 has been represented integrally. In this example it is entirely similar to that of FIG. 1.

In this figure the operation of the anti-roll device can be visualised clearly: for example, if the left-hand wheel 2a moves upwards relative to the body 5, the movement of the lower left-hand arm 7a is transmitted by the left-hand rod 102a to the left-hand lever 105a of the anti-roll bar 101. The anti-roll bar then tends to swivel around its axis 104 and, via the right-hand lever 105b and rod 102b, transmits to the lower right-hand arm 7b a force which tends to move the right-hand wheel 2b upwards relative to the body.

FIG. 11 represents the vehicle of FIG. 10 schematically in a roll situation. The body is inclined by an angle a to the left, for example because the vehicle is rounding a bend to the right. When the body tilts, the axis of the anti-roll bar also tilts and the anti-roll device puts load on the left part of the suspension and relieves the load on the right part as described above. Also represented schematically (by the asymmetry of the representation of the left lever 105a and right 105b lever), is the fact that the anti-roll bar 101 is twisted about its axis 104. The figure illustrates clearly that the anti-roll device 100 also influences the camber. In effect, during the rolling action, since the rods 102a and 102b are inclined relative to the vertical, the anti-roll device exerts a transverse force on the rocker 41 which tends to make it pivot. In this figure the forces generated tend to tilt the wheels to the right of the figure, i.e. to impart counter-camber to the outside wheel (left, 2a) and camber to the inside wheel (right, 2b).

The angle β of inclination of the left wheel 2a is therefore here the result of two effects: the effect of the transverse forces applied in the contact area of the tyres (see FIG. 5) and the effect of the anti-roll device. The effect of the anti-roll device on both the camber and the rolling of the body is a function of the difference between the vertical suspension deflections of the two wheels on the same axle.

These figures show clearly that the more that the rods are inclined relative to the vertical, the greater will be the effect on the camber. Clearly, the rigidity of the anti-roll bar must be adapted as a function of this inclination in such manner as to ensure the requisite control of the body roll.

It is clear that the configurations illustrated combine geometrical and technological characteristics. A very large number of combinations have not been explicitly described, but it will be evident to those with acknowledge of suspension systems that the elements described, and any element not described but known as such, can be associated in various ways. The purpose of the figures has only been to illustrate the principles which characterise the invention.

As has been seen, as a function of the operational characteristics required a position can be chosen for the instantaneous centre of rotation of the camber movement (CIR r/c) within a range from 0.3r above ground level to 0.5r below ground level (r being the radius of the wheel). The fact that this point is located near the ground enables the half-track variation to be limited. For example, in the case of an instantaneous centre of rotation located 0.5r from ground level and with a wheel of radius 300 mm, a 5° camber produces a shift of the contact area relative to the body (half-track variation) of about 12 mm.

The various examples in the figures illustrate the fact that the suspension system of the invention can be made on the basis of very different suspension principles provided that the desired kinematic definition is obtained. In particular, the rockers which have been represented in arbitrary forms can take any suitable form that enables the articulation axes to be positioned appropriately and of course the suspension stresses to be supported. The same applies to the other constitutive elements such as the transverse arms.

The camber plane can be defined as the plane which is orthogonal to the ground, transverse to the vehicle, and passing through the point of application of the resultant of the forces in the contact area. The figures illustrate the principles and several embodiments of the invention in this plane. This two-dimensional representation is advantageous for illustrating clearly the essential characteristics of the system according to the invention, whose purpose is a controlled variation of the camber. In this representation the camber movement is a rotation in the plane about a pivot point (the instantaneous centre of rotation). It must not be forgotten, however, that in reality (in three dimensions) a rotation takes place about a real or virtual pivot axis (the instantaneous axis of rotation). This axis is represented by a point in the planar illustration. It can be constructed essentially parallel to the plane of the ground and to the longitudinal axis of the vehicle to enable the camber variations envisaged. However, by varying the orientation of the axis it is possible to produce supplementary effects of steering, toe-in, toe-out or tracking, as a function of the transverse (cornering) and longitudinal (braking, acceleration) forces undergone by the wheel in the contact area. By carrying out tests and/or by theoretical methods, those with knowledge of the subject will be able to determine the orientation to be adopted as a function of the behaviour expected from the system. For example, experiments have shown that an inclination of the pivot axis by 6° relative to the horizontal produces a steering effect linked to the camber, whose angle is 10 times smaller than the camber angle. Thus, when the transverse forces induce a camber of 5° the steering effect is about 0.5°. The said inclination of the pivot axis can be obtained, for example by fitting the vehicle with a device inclined at 6° to the vertical.

The figures do not show all the elements required for but nevertheless known to be part of a suspension system. In particular, those with knowledge of the subject will understand how to ensure the longitudinal positioning of the wheel plane, for example by means of a longitudinal arm or by guiding the rocker and a linking the rocker to the wheel support by a wishbone or trapezium. Similarly, the position of the wheel plane during steering is ensured either by an element connected to the steering system or by an element of fixed size such as a track rod for a non-steering axle. However, a preferred embodiment of the system according to the invention is one in which these steering control elements directly connect the wheel support to the rocker so that the steering can be controlled without undergoing perturbations caused by the substantial camber variations made possible by the device according to the invention. Preferably, this linkage of the rocker to the wheel support can be used to induce a steering effect as a function of the camber since the movements of the rocker are directly coupled to the camber. Thus, when the camber is governed by the transverse forces (in the case when the system of the invention operates passively), the steering can be induced by the transverse forces. This effect is therefore the same as that of inclining the pivot axis as described above.

As described earlier, the figures show planar representations, i.e. two-dimensional ones in the camber plane. This view gives a clear picture of the theoretical camber and track variation functions of the systems according to the invention. In practice, i.e. in three dimensions, systems conforming to those principles can be designed by faithfully extrapolating their characteristics from the two-dimensional representations. In this case the pivot points become axes perpendicular to the camber plane. However, the principles can also be applied to systems whose representation in projection on the camber plane is different but whose kinematics in the camber plane conform to that described here in two dimensions. For example, such a system can comprise a lower wishbone, an upper wishbone and a track rod. The translation of such a system's operation in the camber plane goes beyond determining an equivalent configuration in two dimensions. This can be the result of an experimental or theoretical study of the wheel's movements around its mean position in the camber plane from which this equivalent configuration can be deduced.

The articulations of the various elements of the suspension system according to the invention can be formed in various ways. The elastomeric articulations currently used in the field of ground contact systems can make it more simple to obtain equilibrium of the system because they introduce stiffness. In addition, they are known to favour the vehicle's comfort.

The system of the invention can be implemented for the purpose of compensating deformations of the elements of the ground contact systems of present-day vehicles and enabling improved performances. In other words, the system of the invention can be used to ensure that the wheel plane will in all circumstances remain essentially perpendicular to the plane of the ground or slightly inclined, so as also to allow for any deformation of the tyre. This result is generally achieved by a system according to the invention whose useful camber amplitude is only a few degrees. However, the system of the invention can also be implemented for the purpose of allowing a much larger camber variation, i.e. allowing the ground contact system to operate in a way more like that of a motor-cycle than that of vehicles with three or more wheels, currently on the market.

In the case when a rotating anti-roll bar is used, the bearings 103 must ensure that the bar is held axially relative to the body in order to be able to transmit transverse forces. This can be achieved by a rigid abutment or an elastic contact. A preferred embodiment uses elastomeric sleeves which ensure that the bar can rotate and at the same time hold it transversely.

In the suspension system of the invention, since the anti-roll device affects the camber, the use of a controlled anti-roll device enables the camber to be influenced via the control of the anti-roll device. Various active or controlled anti-roll devices are known as such.

In a general way the figures represent a wheel (2) comprising a pneumatic tyre, but the invention is naturally also relevant to any type of wheel, with or without an elastic tyre whether this be pneumatic or not, an essential characteristic being the position of the instantaneous centre of rotation relative to the contact area, such as it is.

The invention claimed is:

1. A suspension system for a vehicle, including a rocker for connection to a vehicle body and suspension elements for connecting the rocker to a wheel support in a manner conferring on the wheel support a degree of camber freedom and a degree of freedom of suspension deflection which are independent of one another, and further including an anti-roll device arranged to influence camber variation as a function of the difference between a vertical deflection of the wheel compared to a vertical deflection of an opposite rotation relative to the body about an axis which is displaceable relative to the vehicle body, respective inner ends of the suspension elements being connected to the rocker for pivoting movement about respective pivot axes that are fixed spacially relative to the rocker.

2. Vehicle equipped with the suspension system according to claims 1.

3. Suspension system according to claim 1 wherein respective outer ends of the suspension elements are pivotably connected directly to the wheel support.

4. Suspension system according to claim 1 wherein the rocker is mounted to the body by a pair of rods whose upper ends are pivotably connected directly to the body and whose lower ends are pivotably connected directly to the rocker.

5. System according to claim 1, in which the wheel support carries a wheel of radius "r" that is in contact with the ground (S) and the camber movement of the wheel support relative to the body has an instantaneous centre of rotation (CIR r/c) located within a range of 0.3r above ground level and 1.0r below ground level and preferably 0.5r below ground level.

6. Suspension system according to claim 5, in which the anti-roll device comprises an anti-roll bar which is stressed in torsion and mounted to rotate with respect to the body about a longitudinal axis of the anti-roll bar, and the anti-roll bar is held fast in longitudinal translation relative to the body.

7. Suspension system according to claim 5, in which the anti-roll device is actively controlled.

8. Suspension system according to claim 5, in which the wheel support is designed to carry a wheel intended to be in contact with the ground (S) over a contact area (AC), and in which the anti-roll device is configured such that the transverse force (Fy) exerted by the ground on the wheel in the contact area and generated during a small vertical suspension deflection does not exceed a limit corresponding to 0.1P, wherein P is the axle load.

9. System Suspension system according to claim 8, in which the transverse force (Fy) does not exceed a limit corresponding to 0.05P.

10. Suspension system according to claim 5, the wheel being intended to contact the ground (S) over a contact area (AC), in which the anti-roll device is configured so that the camber variation in the absence of any transverse force (Fy) exerted by the ground during a small vertical suspension deflection does not exceed 2°.

11. Suspension system according to claim 5, in which the anti-roll device is configured so that the axis of the thrust resulting from the action of a suspension spring and of the anti-roll device on a suspension element during a small unilateral vertical suspension deflection, is at most a distance d away from the point (G) of coincidence of the ideal thrust axes, the distance d corresponding to 6.5% of the width of the axle.

12. Suspension system according to claim 5, in which the anti-roll device is arranged so as to influence the camber variation and the body roll angle variation in the same direction.

13. Suspension system according to claim 5, in which the anti-roll device comprises a rod connected to the suspension elements, the rod being inclined relative to the vertical in the mean position of the suspension in such manner that an upper end of the rod is closer to the wheel plane than is a lower end thereof.

14. Suspension system according to claim 13, in which the rod is inclined at an angle greater than 5° relative to the vertical in the mean position of the suspension.

15. Suspension system according to claim 5, in which the instantaneous centre of rotation (CIR r/c) is located below ground level (S) so that transverse forces (Fy) exerted by the ground on the wheel in the contact area (AC) induce a tilt of the wheel support relative to the body in the direction of decreasing camber when the transverse forces are directed towards the inside of the vehicle and are directed in the direction of increasing camber when the transverse forces are directed towards the outside of the vehicle.

16. Suspension system according to claim 5, wherein the wheel support constitutes a first wheel support, and further including the opposite common-axle wheel support which is designed to carry an opposite wheel, said opposite wheel support being connected to the rocker (41) in a configuration symmetrical to that of the first wheel support.

* * * * *